(12) United States Patent
Anderson et al.

(10) Patent No.: US 9,199,442 B2
(45) Date of Patent: Dec. 1, 2015

(54) AUTOMATED PLACEMENT OF VIBRATION DAMPING MATERIALS

(71) Applicant: The Boeing Company, Chicago, IL (US)

(72) Inventors: Donald A. Anderson, Bellevue, WA (US); Tuan Quang Cao, Seattle, WA (US); Michael L. Leggett, Federal Way, WA (US); Anne E. Kyriakides, Tukwila, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/322,916

(22) Filed: Jul. 3, 2014

(65) Prior Publication Data

US 2014/0311678 A1   Oct. 23, 2014

Related U.S. Application Data (62) Division of application No. 13/850,647, filed on Mar. 26, 2013, now abandoned, which is a division of application No. 12/404,270, filed on Mar. 13, 2009, now Pat. No. 8,425,710.

(51) Int. Cl.
*B29C 70/38* (2006.01)
*B32B 38/18* (2006.01)

(52) U.S. Cl.
CPC ............... *B32B 38/18* (2013.01); *B29C 70/386* (2013.01); *Y02T 50/433* (2013.01); *Y10T 156/10* (2015.01); *Y10T 156/12* (2015.01); *Y10T 156/1348* (2015.01); *Y10T 156/17* (2015.01); *Y10T 156/1788* (2015.01); *Y10T 156/1795* (2015.01); *Y10T 428/31504* (2015.04)

(58) Field of Classification Search
CPC ................ B29C 70/386; B29C 70/388; Y10T 156/1795
USPC ............ 156/71, 523, 574, 577; 181/207, 208, 181/284–293
See application file for complete search history.

(56) References Cited

U.S. PATENT DOCUMENTS

| | | | |
|---|---|---|---|
| 3,020,986 | A | 2/1962 | Kirk et al. |
| 3,078,969 | A | 2/1963 | Campbell et al. |
| 3,078,971 | A | 2/1963 | Wallerstein, Jr. |
| 3,088,561 | A | 5/1963 | Ruzicka |
| 3,159,249 | A | 12/1964 | Lazan |
| 3,193,049 | A | 7/1965 | Wollek |

(Continued)

FOREIGN PATENT DOCUMENTS

| | | |
|---|---|---|
| EP | 1500494 | 1/2005 |
| GB | 2390999 | 1/2004 |

(Continued)

OTHER PUBLICATIONS

"Aircraft Damping Composites," ADC Product Bulletin, Aearo Specialty Composites, copyright 2012, 4 pages, accessed May 16, 2012, http://http://www.earaircraft.com/img/uploads/lit/news_1.pdf.

(Continued)

*Primary Examiner* — Scott W Dodds
(74) *Attorney, Agent, or Firm* — Yee & Associates, P.C.

(57) ABSTRACT

Damping material is installed on a structure by moving a material placement head over the structure, and using the head to place the material on the structure.

16 Claims, 8 Drawing Sheets

(56) References Cited

U.S. PATENT DOCUMENTS

| | | |
|---|---|---|
| 3,832,955 A | 9/1974 | Pottinger et al. |
| 4,182,495 A | 1/1980 | Borgmeier et al. |
| 4,317,503 A | 3/1982 | Soderquist et al. |
| 4,401,495 A | 8/1983 | McKinney |
| 4,416,349 A | 11/1983 | Jacobs |
| 4,425,980 A | 1/1984 | Miles |
| 4,428,454 A | 1/1984 | Capaul et al. |
| 4,463,044 A | 7/1984 | McKinney |
| 4,477,304 A | 10/1984 | Westermann |
| 4,522,165 A | 6/1985 | Ogawa |
| 4,553,631 A | 11/1985 | Panza |
| 4,556,439 A | 12/1985 | Bannink, Jr. |
| 4,591,402 A | 5/1986 | Evans et al. |
| 4,608,220 A | 8/1986 | Caldwell et al. |
| 4,611,687 A | 9/1986 | Nixon |
| 4,635,882 A | 1/1987 | SenGupta et al. |
| 4,678,707 A | 7/1987 | Shinozaki et al. |
| 4,699,683 A | 10/1987 | McCowin |
| 4,767,656 A | 8/1988 | Chee et al. |
| 4,786,343 A | 11/1988 | Hertzberg |
| 4,828,202 A | 5/1989 | Jacobs et al. |
| 4,851,501 A | 7/1989 | Lubowitz et al. |
| 4,860,851 A | 8/1989 | Krevor et al. |
| 4,877,471 A | 10/1989 | McCowin et al. |
| 4,882,007 A | 11/1989 | Lengen et al. |
| 4,931,340 A | 6/1990 | Baba et al. |
| 4,966,802 A | 10/1990 | Hertzberg |
| 5,024,399 A | 6/1991 | Barquet et al. |
| 5,063,098 A | 11/1991 | Niwa et al. |
| 5,087,491 A | 2/1992 | Barrett |
| 5,106,668 A | 4/1992 | Turner et al. |
| 5,151,311 A | 9/1992 | Parente et al. |
| 5,165,627 A | 11/1992 | Amano et al. |
| 5,178,717 A | 1/1993 | Rodriguez |
| 5,200,019 A | 4/1993 | Brandis et al. |
| 5,209,804 A * | 5/1993 | Trudeau ................ 156/364 |
| 5,232,073 A | 8/1993 | Bronowicki et al. |
| 5,256,223 A | 10/1993 | Alberts et al. |
| 5,268,055 A | 12/1993 | Bales et al. |
| 5,277,958 A | 1/1994 | Tomkins |
| 5,308,675 A | 5/1994 | Crane et al. |
| 5,368,914 A | 11/1994 | Barrett |
| 5,445,861 A | 8/1995 | Newton et al. |
| 5,507,477 A | 4/1996 | Manning et al. |
| 5,527,414 A | 6/1996 | Dublinski et al. |
| 5,604,010 A | 2/1997 | Hartz et al. |
| 5,622,733 A | 4/1997 | Asher |
| 5,667,866 A | 9/1997 | Reese, Jr. |
| 5,700,347 A | 12/1997 | McCowin |
| 5,710,396 A | 1/1998 | Rogers |
| 5,712,017 A | 1/1998 | Jordan |
| 5,744,221 A | 4/1998 | Crane et al. |
| 5,851,336 A | 12/1998 | Cundiff et al. |
| 5,866,272 A | 2/1999 | Westre et al. |
| 5,895,013 A | 4/1999 | Towfiq |
| 5,902,755 A | 5/1999 | Driggett et al. |
| 5,904,318 A | 5/1999 | Towfiq |
| 5,916,954 A | 6/1999 | Bohn et al. |
| 5,958,556 A | 9/1999 | McCutcheon |
| 6,065,717 A | 5/2000 | Boock |
| 6,110,985 A | 8/2000 | Wheeler |
| 6,114,050 A | 9/2000 | Westre et al. |
| 6,117,518 A | 9/2000 | Cawse et al. |
| 6,179,086 B1 | 1/2001 | Bansemir et al. |
| 6,399,199 B1 | 6/2002 | Fujino et al. |
| 6,419,774 B1 | 7/2002 | Clifford |
| 6,497,190 B1 | 12/2002 | Lewit |
| 6,510,961 B1 | 1/2003 | Head et al. |
| 6,632,502 B1 | 10/2003 | Allen et al. |
| 6,659,223 B2 | 12/2003 | Allison et al. |
| 6,696,164 B2 | 2/2004 | Clifford |
| 6,755,998 B1 | 6/2004 | Reichard et al. |
| 6,764,754 B1 | 7/2004 | Hunter et al. |
| 6,878,320 B1 | 4/2005 | Alderson et al. |
| 7,040,575 B2 | 5/2006 | Struve et al. |
| 7,063,763 B2 | 6/2006 | Chapman, Jr. |
| 7,074,474 B2 | 7/2006 | Toi et al. |
| 7,083,147 B2 | 8/2006 | Movsesian et al. |
| 7,134,629 B2 | 11/2006 | Johnson et al. |
| D533,950 S | 12/2006 | Givoni |
| 7,160,621 B2 | 1/2007 | Chaudhari et al. |
| 7,181,891 B2 | 2/2007 | Surace et al. |
| 7,197,852 B2 | 4/2007 | Grillos |
| 7,213,629 B2 | 5/2007 | Ledet et al. |
| 7,282,107 B2 | 10/2007 | Johnson et al. |
| 7,291,373 B2 | 11/2007 | Bartley-Cho et al. |
| 7,325,771 B2 | 2/2008 | Stulc et al. |
| 7,364,221 B2 | 4/2008 | Tahri et al. |
| 7,419,031 B2 | 9/2008 | Liguore et al. |
| 7,419,627 B2 | 9/2008 | Sheu et al. |
| 7,503,368 B2 | 3/2009 | Chapman et al. |
| 7,527,222 B2 | 5/2009 | Biornstad et al. |
| 7,578,468 B2 | 8/2009 | Drost |
| 7,681,615 B2 | 3/2010 | McCowin |
| 7,766,063 B2 | 8/2010 | Lauder et al. |
| 7,798,285 B2 | 9/2010 | Chiou et al. |
| 7,837,147 B2 | 11/2010 | Liguore et al. |
| 7,931,240 B2 | 4/2011 | Kothera et al. |
| 8,042,768 B2 | 10/2011 | Liguore et al. |
| 8,105,523 B2 | 1/2012 | Edelmann et al. |
| 8,181,417 B2 | 5/2012 | Surace et al. |
| 8,425,710 B2 | 4/2013 | Anderson et al. |
| 2003/0168555 A1 | 9/2003 | Livi et al. |
| 2005/0016671 A1 | 1/2005 | Sharp |
| 2005/0039843 A1 * | 2/2005 | Johnson et al. ............... 156/175 |
| 2005/0194210 A1 | 9/2005 | Panossian |
| 2006/0118244 A1 | 6/2006 | Zaballos et al. |
| 2007/0069080 A1 | 3/2007 | Rassaian et al. |
| 2007/0071957 A1 | 3/2007 | Atkins et al. |
| 2007/0095982 A1 | 5/2007 | Kismarton et al. |
| 2007/0125474 A1 | 6/2007 | Barker et al. |
| 2008/0029644 A1 | 2/2008 | Martinez Cerezo et al. |
| 2008/0277057 A1 | 11/2008 | Montgomery et al. |
| 2008/0282863 A1 | 11/2008 | McCowin |
| 2009/0211698 A1 * | 8/2009 | McCowin ................ 156/250 |
| 2010/0133039 A1 | 6/2010 | Liguore |
| 2010/0133380 A1 | 6/2010 | Roebroeks et al. |
| 2010/0230202 A1 | 9/2010 | Anderson et al. |
| 2010/0282904 A1 | 11/2010 | Kismarton et al. |
| 2012/0097321 A1 | 4/2012 | Liguore et al. |

FOREIGN PATENT DOCUMENTS

| | | |
|---|---|---|
| WO | WO0001524 | 1/2000 |
| WO | WO2007137607 | 12/2007 |
| WO | WO2008115301 | 9/2008 |

OTHER PUBLICATIONS

Biggerstaff et al., "Shear Measurements of Viscoelastic Damping Materials Embedded in Composite Plates," Journal of Composite Materials, vol. 33, 1990, 11 pages.

Damping Technologies, Inc., "Stand-Off Damping Systems," undated, 4 pages.

"Strip," Random House, Inc., copyright 2012, 1 page. Accessed May 16, 2012, http://dictionary.reference.com/browse/strip.

Robinson et al., "Improved Damping in VARTM Composite Structures using Perforated Viscoelastic Layers," Journal of Composite Materials, vol. 40, No. 23, Nov. 2006, pp. 2157-2173.

Roush Industries, Inc., "Damped Viscoelastic Acyrlic Adhesive—RA980," 2004, 2 pages.

Notice of Allowance, dated Mar. 31, 2004, regarding U.S. Appl. No. 10/620,066, 9 pages.

Office Action, dated Mar. 16, 2012, regarding U.S. Appl. No. 13/280,204, 20 pages.

Notice of Allowance, dated Jun. 25, 2012, regarding U.S. Appl. No. 13/280,204, 7 pages.

Office Action, dated Feb. 17, 2011, regarding U.S. Appl. No. 12/851,431, 15 pages.

Notice of Allowance, dated Jul. 26, 2011, regarding U.S. Appl. No. 12/851,431, 7 pages.

(56) References Cited

OTHER PUBLICATIONS

Office Action, dated Jul. 9, 2010, regarding U.S. Appl. No. 11/656,626, 9 pages.
Final Office Action, dated Feb. 2, 2011, regarding U.S. Appl. No. 11/656,626, 7 pages.
Office Action, dated Jul. 26, 2011, regarding U.S. Appl. No. 11/656,626, 7 pages.
Final Office Action, dated Feb. 14, 2012, regarding U.S. Appl. No. 11/656,626, 9 pages.
Office Action, dated Nov. 5, 2012, regarding U.S. Appl. No. 11/656,626, 36 pages.
Office Action, dated Jul. 9, 2008, regarding U.S. Appl. No. 11/084,779, 18 pages.
Office Action, dated Jan. 21, 2009, regarding U.S. Appl. No. 11/084,779, 16 pages.
Final Office Action, dated Jun. 24, 2009, regarding U.S. Appl. No. 11/084,779, 14 pages.
Office Action, dated Nov. 9, 2009, regarding U.S. Appl. No. 11/084,779, 8 pages.
Notice of Allowance, dated May 6, 2010, regarding U.S. Appl. No. 11/084,779, 6 pages.
International Search Report dated Oct. 22, 2008, regarding Application No. PCT/US2007/087267 (WO2008115301), 3 pages.
European Patent Office Communication dated Jul. 27, 2011, regarding Application No. EP07874425.7, 4 pages.
Final Office Action, dated May 23, 2013, regarding U.S. Appl. No. 11/656,626, 12 pages.

\* cited by examiner

AUTOMATED PLACEMENT OF VIBRATION DAMPING MATERIALS

This application is a divisional of U.S. patent application Ser. No. 13/850,647, filed on Mar. 26, 2013, the status of which is pending. In addition, application Ser. No. 13/850,647 is a divisional of U.S. Pat. No. 8,425,710, filed Mar. 13, 2009. Thus, this application is a grandchild application to U.S. Pat. No. 8,425,710.

BACKGROUND INFORMATION

1. Field

This disclosure generally relates to damping materials used to absorb or attenuate acoustic and/or mechanical vibrations and deals more particularly with a method and apparatus for automated placement of damping materials on structures.

2. Background

Damping materials are used in a variety of applications to dampen or attenuate acoustic and/or mechanical vibrations in a structure. For example, acoustic dampening materials are commonly used in parts of vehicles to reduce the noise in passenger cabins produced by external sources such as engines and turbulent airflow.

In aircraft applications, patches of viscoelastic material have been added to various parts of an aircraft structure in order to reduce noise and vibration. These patches may be relatively expensive to install, in part due to the hand labor required to fit, cut, and bond the patches to uniquely shaped structures on the aircraft. Moreover, these patches add weight to the aircraft which may reduce operating efficiency since several hundred and even thousands of such patches may be required for a typical commercial aircraft.

More recently, relatively lightweight composite laminates have been devised which may incorporate viscoelastic materials that act to absorb and thereby attenuate vibration in aircraft structures. While these new damping materials have a number of advantages, their widespread use on aircraft structures may be limited because of the time and manual labor required for their installation, particularly where the aircraft structure has a complicated geometry and precise hand placement of the viscoelastic material on or within the lamina of the structure is required.

Accordingly, there is a need for automated placement of damping materials on structures such as aircraft which reduces the need for hand labor to install the material, and which may provide rapid placement of the materials with high placement accuracy.

SUMMARY

The disclosed embodiments provide for automated placement of acoustic damping materials which reduces reliance on hand labor for installation and may result in higher placement accuracy. A method and apparatus are provided for placing damping materials at high laydown rates, and which are compatible with the layup and assembly processes commonly used to produce large scale aircraft at higher production rates.

According to one method embodiment, damping material may be installed on a structure using a material placement head. The material placement head is moved over the structure and is used to place the damping material on the structure. The head compacts the damping material against the structure, and the movement of the head may be controlled using a programmed computer.

According to another method embodiment damping acoustic vibrations in a structure is performed. A vibration damping tape is produced, and automatic tape placement equipment is employed to place the tape in any of various configurations as a single strip or as multiple side-by-side strips, either of which may be continuous or discontinuous. The tape may include a removable backing which is removed and accumulated on a take-up spool as the tape is being placed on the structure.

According to another embodiment, apparatus is provided for placing damping material on a structure. The apparatus includes a material placement head for placing damping material on the structure, and means for moving the head over the structure. Control means are provided for controlling the operation of the head and the movement of the head. The head may include a supply of damping material, means for dispensing the damping material from the supply, and means for compacting the damping material on the structure. The damping material may be in the form of a tape which is placed by the head as strips onto the structure.

The disclosed embodiments therefore satisfy the need for a method and apparatus for rapidly placing damping material on a structure at high laydown rates with high placement accuracy, and which reduces the need for hand labor.

DETAILED DESCRIPTION

Figure 1:
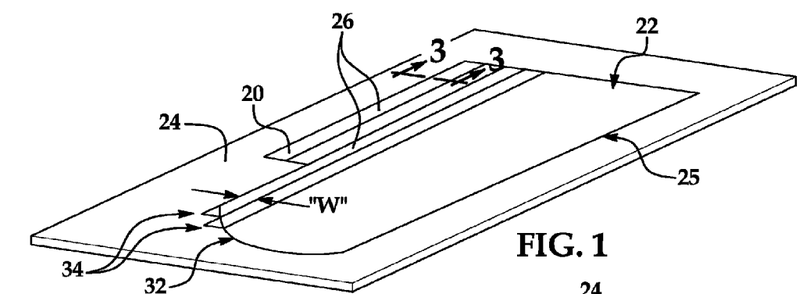
FIG. 1 is an illustration in perspective of a structure on which contiguous strips of damping material have been placed over an entire area of a structure according to the disclosed embodiments.
Figure 2:
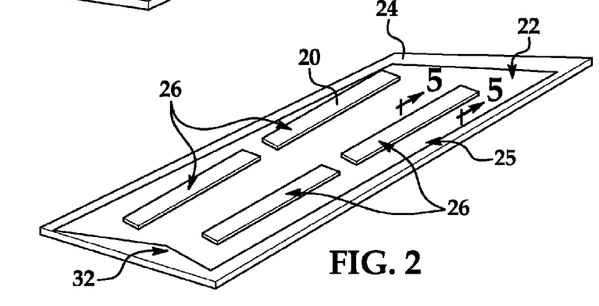
FIG. 2 is an illustration similar to FIG. 1, wherein only several separated strips have been placed on the structure.

Referring first to FIGS. 1 and 2, the disclosed embodiments broadly relate to a method and later discussed apparatus for installing damping material, which may be in the form of strips 26 of tape 20, on a structure 24. As used herein, "damping" and "damping material" are intended to refer to a wide variety of materials that function to absorb, attenuate and/or dissipate vibrations that may be produced by mechanical, acoustical or other sources, and which may be transmitted through the structure 24. Structure 24 is typically a substantially rigid material such as, without limitation, a composite or a metal, of the type used in the aircraft industry to fabricate a wide range of components and subassemblies including, for example and without limitation, a fuselage (not shown). The structure 24 may be a completed component, or may be a component that is in an intermediate stage of layup or assembly. As shown in FIG. 1, the strips 26 of tape 20 may be placed side-by-side to cover an entire application area 22 of a structure 24, or as shown in FIG. 2, one or more separate strips 26 of the tape 20 may be placed on only certain sections of the structure 24 within a particular application area 22.

The tape 20 may have a width "W" and may comprise any of a wide range of materials which, as mentioned above, act to reduce the transmission of vibrations. Examples of suitable damping materials that may be used in connection with the disclosed embodiments may be found, without limitation, in US Patent Publication 2008/0277057 A1 published Nov. 13, 2008, the entire disclosure of which is incorporated by reference herein.

Figure 3:
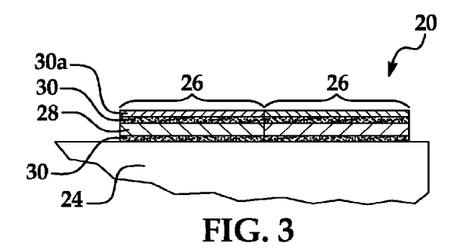
FIG. 3 is an illustration in section taken along the line 3-3 in FIG. 1.

FIG. 3 illustrates additional details of one embodiment of the tape 20. An adhesive layer 30 may be laminated to opposite sides of a viscoelastic layer 28. Depending upon the viscoelastic material used for viscoelastic layer 28, it may not be necessary to provide the adhesive layer 30 where the viscoelastic layer 28 possesses sufficient tack to adhere the tape 20 to the structure 24. A thin layer of upper backing 30a, which may be a release paper or a poly lining, may be placed over the adhesive layer 30 in order to protect the adhesive layer 30 from adhering to undesired particles or objects during the installation process. Where an adhesive layer 30 is not used, the upper backing 30a may be placed directly over the viscoelastic layer 28 to protect the viscoelastic layer 28. The backing 30a may be later peeled away to reveal the adhesive layer 30 or viscoelastic layer 28, which may then be used to adhere to the structure 24. The tape 20, illustrated in FIG. 3, is merely exemplary to aid in the description of the embodiments.

Figure 4:
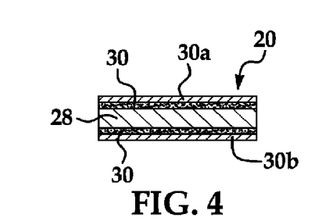
FIG. 4 is an illustration in cross section of the acoustic damping tape shown in FIG. 3 but prior to being placed on the structure.

FIG. 4 illustrates the tape 20 shown in FIG. 2 before being placed on the structure 24. An additional layer of lower backing 30b has been applied over the lower layer of adhesive layer 30 or the viscoelastic layer 28 in order to protect the adhesive layer 30 or viscoelastic layer 28 until the tape 20 is ready to be placed on the structure 24. As will be discussed below, the use of the upper backing 30a and lower backing 30b permits easy handling and manipulation of the tape 20 by automated tape placement equipment discussed below. At least one of the upper backing 30a lower and backing 30b should have a stiffness or thickness sufficient to give the tape 20 enough stiffness such that it may be processed through an automatic tape placement head (discussed below) without folding or wrinkling within the head.

Figure 5:
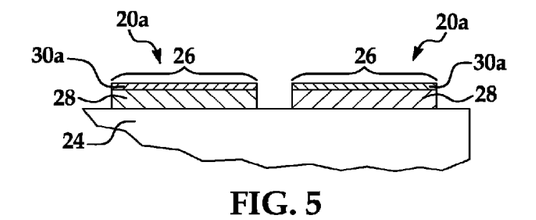
FIG. 5 is an illustration in section taken along the line 5-5 in FIG. 2, showing another form of the acoustic damping tape.

FIG. 5 illustrates another embodiment of the tape 20a wherein the viscoelastic layer 28 has sufficient tack to adhere the tape 20a directly to the structure 24, thus obviating the need for the previously discussed adhesive layer 30. In this example, the upper backing 30a protectively covers and is adhered directly to the viscoelastic layer 28.

Figure 6:
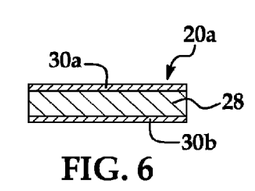
FIG. 6 is an illustration in cross section of the acoustic damping tape shown in FIG. 5 but prior to being placed on the structure.

FIG. 6 shows the tape 20a prior to being placed on the structure 24, wherein a lower backing 30b protectively covers and is adhered directly to the viscoelastic layer 28 until the lower backing 30b is removed during the placement process.

Referring particularly to FIGS. 1 and 2, using the method and apparatus of the disclosed embodiments, the tape 20 may be placed within an application area 22 on the structure 24 in any of various configurations. For example and without limitation, the tape 20 may be placed on the structure 24 as one or more individual strips 26 (FIG. 2) or as multiple side-by-side strips 26 (FIG. 1), which can be continuous or discontinuous, and contiguous or non-contiguous. The structure 24 may be part of a subassembly or a component that is later assembled with other components. For example, the structure 24 may comprise a fuselage or interior walls of an aircraft (not shown) or similar vehicle.

Figure 7:
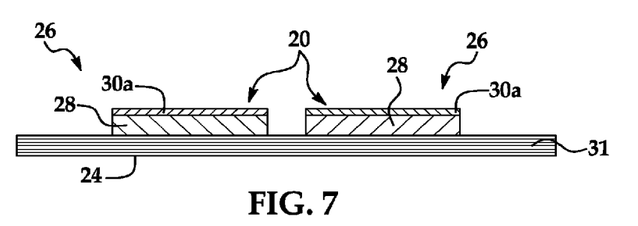
FIG. 7 is an illustration of a sectional view of a composite ply on which strips of the damping tape have been placed.

Moreover, as shown in FIG. 7, the structure 24 may comprise plies 31 forming part of a layup (not shown) upon which strips 26 of the tape 20 may be placed.

Figure 8:
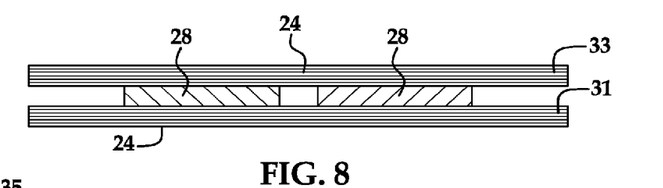
FIG. 8 is an illustration similar to FIG. 7, but showing an additional ply having been placed over and adhered to the damping tape.

As shown in FIG. 8, following placement of the tape 20 and removal of the upper backing 30a, additional plies 33 may be placed over and adhered to the strips 26 of tape 20, so that the viscoelastic layer 28 is sandwiched between plies 31 and plies 33 of the layup.

Referring again to FIG. 1, the application area 22 may have outer boundaries 25 which may include one or more contours 32. As will be discussed below in more detail, once the outer boundaries 25 of the application area 22 are determined, the number and position of strips 26 that are needed to cover the application area 22 are calculated. Using later discussed automated equipment, the tape 20 is applied in strips 26 which generally fit within the outer boundaries 25 and may be cut as shown at 34 to substantially match any contours 32 defining the application area 22. The width of the strips 26 covering the application area 22 may be determined by the width of the tape 20. Alternatively, as shown in FIG. 2, the strips 26 may be placed separate from each other in a staggered and/or uniform or non-uniform, and/or continuous or non-continuous pattern as determined by the programming of later discussed the automated placement.

Figure 9:
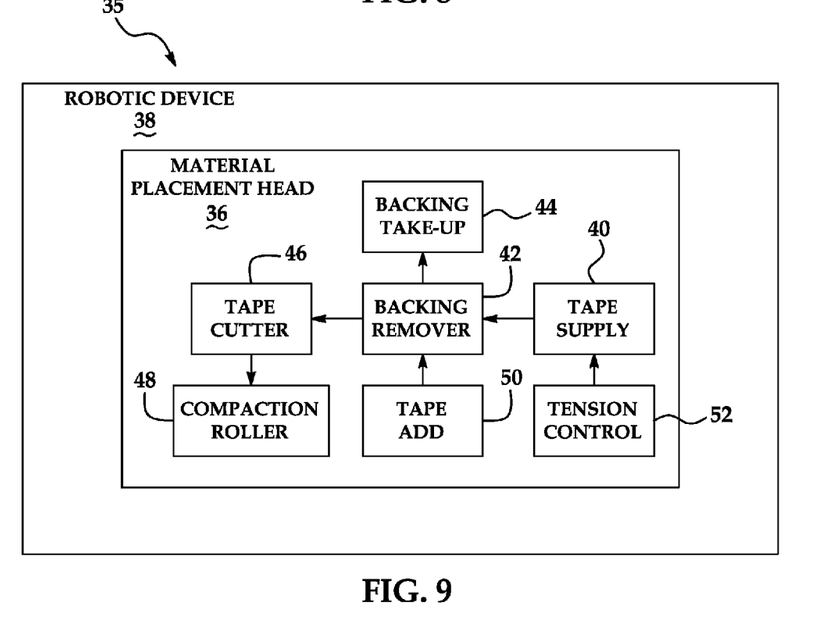
FIG. 9 is an illustration of a functional block diagram of apparatus for placing damping materials on a structure.

FIG. 9 illustrates the basic components of apparatus 35 that may be employed for placing the strips 26 of tape 20 to cover the application area 22 of the structure 24 shown in FIGS. 1 and 2. A material placement head 36 may be moved over the structure 24 by any of various manipulators, such as a robotic device 38. Alternatively, the material placement head 36 may be moved by a gantry type structure (not shown) or other well-known arrangements used for moving an end effecter in industrial applications.

The material placement head 36 broadly includes a tape supply 40 which dispenses lengths of tape 20 that may be cut by a tape cutter 46, and compacted onto the structure 24 by a compaction roller 48. A tension control 52 may be provided to apply tension to the tape 20 as it is dispensed from the tape supply 40 so that proper tension is applied to the tape 20 until it is placed. Proper tape tension is desired so that the tape 20 feeds properly through the material placement head 36 and the tape 20 is held substantially taut against the compaction roller 48 as the tape is being placed onto the structure 24. In the case of the tape 20 illustrated in FIGS. 3-7, a backing remover 42 may be provided which removes the backing 30b as the tape 20 is being dispensed from a tape supply 40 to the compaction roller 48 to form the substantially contiguous strips 26. In other embodiments, the backing remover 42 may remove both upper backing 30a and lower backing 30b.

A backing take-up device 44 is provided for taking up the backing 30b as it is being removed by the backing remover 42. In other embodiments, a second backing take-up device (not shown) may be provided on the material placement head 36 to take up the upper backing 30a removed from the tape 20. As the material placement head 36 is being moved over the structure 24 by the robotic device 38, a tape cutter 46 cuts the dispensed tape 20 to length while the compaction roller 48 is compacting the cut length of tape 20 onto the structure 24.

Figure 10:
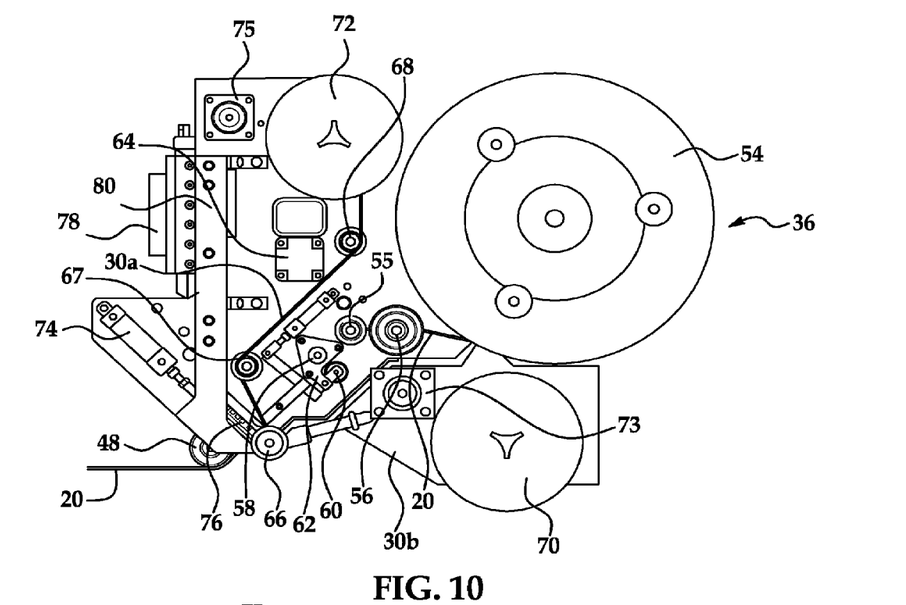
FIG. 10 is an illustration of a side view of a material placement head suitable for placing strips of damping tape on a structure.
Figure 11:
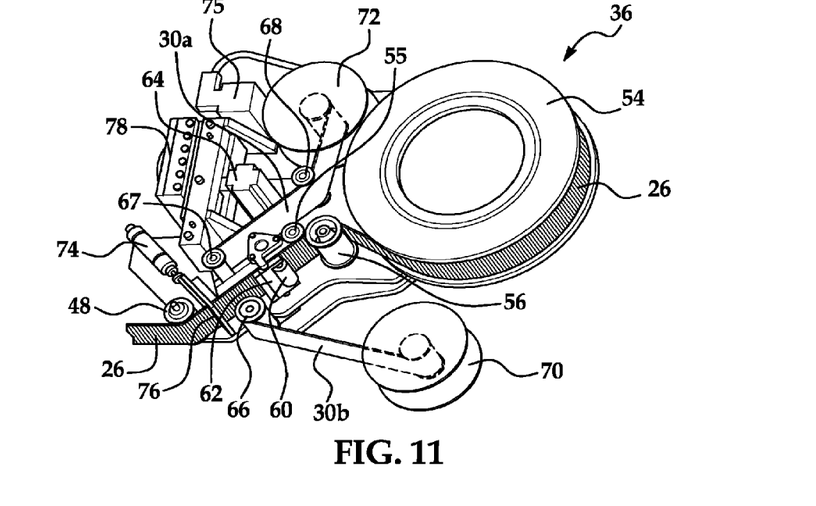
FIG. 11 is an illustration of a perspective view of the material placement head shown in FIG. 10.
Figure 12:
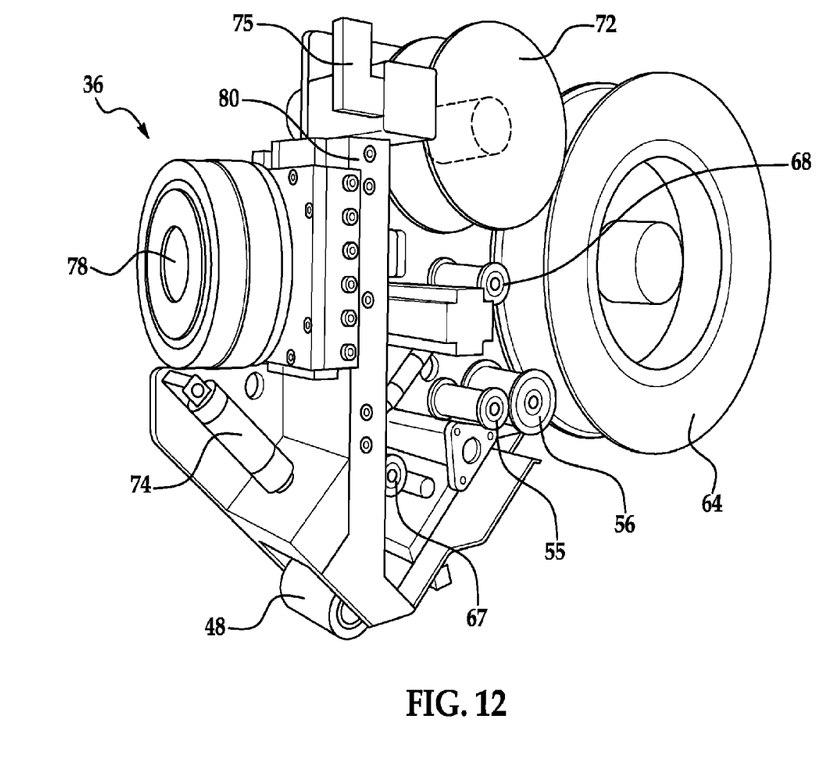
FIG. 12 is a further illustration in perspective of the material placement head shown in FIGS. 10 and 11.

Attention is now directed to FIGS. 10, 11 and 12 which illustrate additional details of the material placement head 36. The tape supply 40 shown in FIG. 9 may comprise a spool 54 of tape 20. The tape 20 from spool 54 is trained between guide roller 55 and guide roller 56 and fed to a pinch roller 60 powered by a servomotor 64. The tape 20 passes beneath the pinch roller 60 and is directed by a guide plate 62 to a cutter 76 driven by a pneumatic cylinder 74 forming part of the tape cutter 46 shown in FIG. 9. The cutter 76 cuts the tape 20 as it is being fed to the compaction roller 48 which compacts the dispensed tape 20 against the structure 24.

The backing remover 42 (FIG. 9) may remove the lower backing 30b as the tape 20 leaves the spool 54. The lower backing 30b is trained around guide roller 66 and is guided by lower backing 30b onto a take-up spool 70 powered by a motor 73 which accumulates the lower backing 30b as the tape 20 is being placed onto the structure 24. A second, optional take-up spool 72 is provided in those applications where it is desired to remove the upper backing 30a prior to the tape 20 being placed on the structure 24. Following its removal from the tape 20, the upper backing 30a is trained around guide roller 67 and guide roller 68 before being accumulated on take-up spool 72 powered by a motor 75.

The compaction roller 48 is mounted on a powered compaction slide 80 which is vertically reciprocable, and may selectively displace the compaction roller 48 downwardly into engagement with the structure 24. At the end of the placement of strips 26 of tape 20, the powered compaction slide 80 may be powered upwardly so that the compaction roller 48 disengages the structure 24 until the next strips 26 of tape 20 is ready to be placed. The entire material placement head 36 may be releasably mounted on a later discussed robotic device (not shown) by means of a mount 78. Additional details of the material placement head 36 may be at least similar to those disclosed in U.S. Pat. Nos. 4,699,683 and 5,700,347, and US Patent Publication No. 2006/0118244 A1 published Jun. 8, 2006, the entire disclosures of which are incorporated by reference herein. It should be noted here that although the illustrated material placement head 36 has been described as being capable of placing a single strip of strips 26 of tape 20 on a structure 24, other embodiments of the material placement head 36 may include multiple tape dispensing mechanisms capable of simultaneously placing multiple strips 26 of tape 20 on a structure 24.

Figure 13:
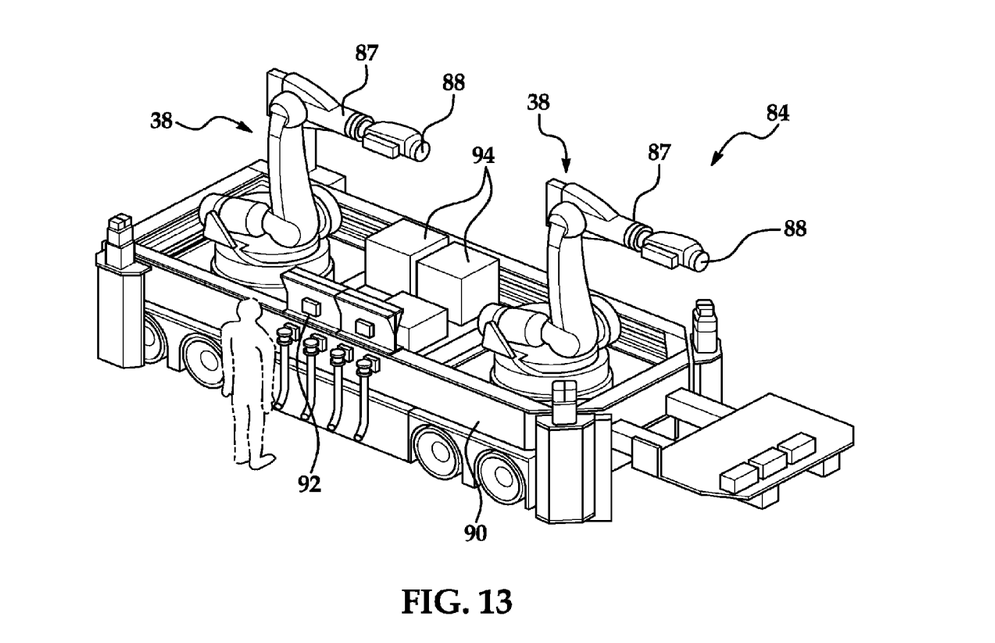
FIG. 13 is an illustration of an isometric view of mobile apparatus for operating multiple material placement heads used in high production application.

FIG. 13 illustrates a mobile apparatus 84 for automated placement of damping material on a structure 24 (FIGS. 1 and 2). A pair of robotic devices 38 are mounted on a mobile base 90 which allows the robotic devices 38 to be moved into proximity to areas of a structure where damping material is to be installed. Each of the robotic devices 38 includes a multi-axis arm and wrist assembly 87 including an end effector mount 88 which may be adapted to be coupled with the mount 78 on the material placement head 36 shown in FIGS. 10, 11 and 12. The mobile apparatus 84 may include operator controls 92 and an onboard computer and related components 94 for controlling the operation of the robotic devices 38 as well as the material placement head 36. The mobile apparatus 84 may also include a system (not shown) for indexing the material placement head 36 and robotic device 38 to the new location to determine correct positioning of the strips 26 of tape 20. As previously noted, the material placement head 36 may be mounted on any of various types of manipulators capable of moving the material replacement head 36 along multiple axes. Thus, for example, the mobile apparatus 84 may employ multiple gantries (not shown), rather than the robotic devices 38, to independently displace multiple material replacement head 36 and place material on different areas of a tool or substrate.

Figure 14:
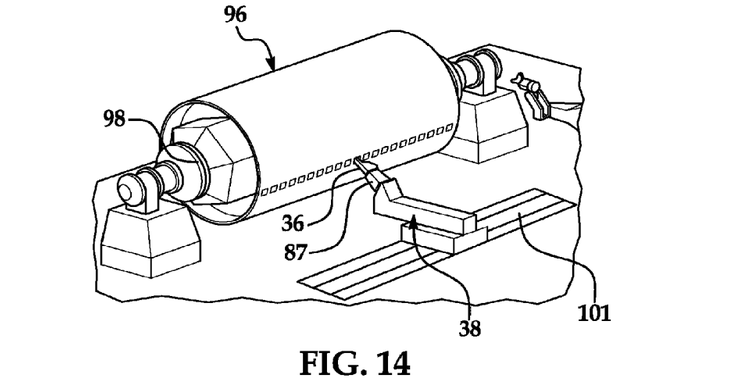
FIG. 14 is an illustration in perspective of an aircraft fuselage layup on which damping material is being automatically placed according to the disclosed embodiments.

FIG. 14 illustrates the use of a material placement head 36 mounted on a robotic device 38 to apply tape 20 to a fuselage section 96. The fuselage section 96 may be supported on a rotatable mandrel 98. A robotic device 38 may be mounted on a track 101 that allows linear movement of the robotic device 38 including the material placement head 36, along the length of the fuselage section 96. Through linear movement of the robotic device 38 and rotation of the mandrel 98, the material placement head 36 may apply damping material to any area of the fuselage section 96.

While the material placement head 36 discussed above in connection with FIGS. 1-14 places damping material in the form of continuous tape 20, it is possible to employ automated methods and apparatus to place damping material having forms and shapes other than the tape 20. For example, referring to FIG. 15, the damping material may be in the form of preformed units 102 that may be individually molded or cut from a suitable damping material. The preformed units 102 may have the same shape, or they may have different shapes that are tailored to be placed at particular locations on a structure 24. For convenience of description, the units 102 are illustrated as being simple rectangles.

Figure 15:
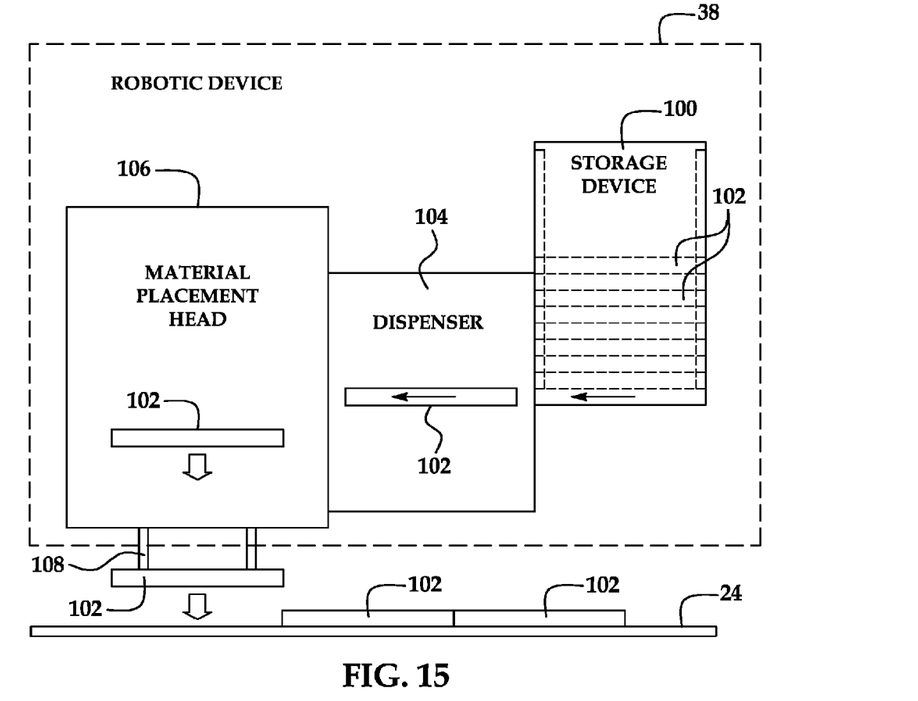
FIG. 15 is an illustration of a functional block diagram of an alternate form of the apparatus used to automatically place preformed units of damping material on a structure.

A material placement head 106 is particularly adapted to place the preformed units 102 on a structure 24. The details of the material placement head 106 will vary, depending upon the size and shape of the preformed units 102, and the particular application. Generally, the material placement head 106 may be mounted on robotic device 38 and may include a manipulator 108 which places the preformed units 102 in desired locations on the structure 24. The manipulator 108 may comprise, for example and without limitation, a pick and place mechanism (not shown). A storage device 100 for holding a supply of the units 102 as well as a dispenser 104 may be carried on the material placement head 106. The storage device 100 may comprise, for example and without limitation, a cartridge arrangement in which the preformed units 102 are stacked and individually moved by the dispenser 104 to the material placement head 106 which places the preformed units 102 onto the structure 24.

Figure 16:
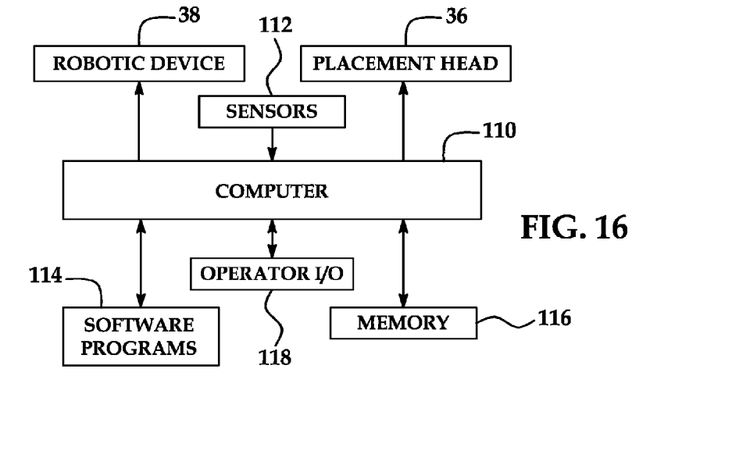
FIG. 16 is an illustration a functional block diagram of a control system forming part of the disclosed embodiments.

FIG. 16 illustrates the basic components of a control system for operating the material placement head 36 and robotic device 38. A computer 110 may provide control signals to the material placement head 36 and robotic device 38. The computer 110 may comprise, without limitation, a PC or a PLC (programmable logic controller) which may include software programs 114 and memory 116. The software programs 114 may include a set of programmed instructions for moving the material placement head 36 in a pre-programmed route over the structure 24, and may also include optimization routines for optimizing the head movement. The software programs 114 may also include programmed instructions for determining the length of tape 20 to be dispensed and the timing of when to cut the tape 20. The computer may further include programmed instructions for calculating the placement and the number of strips 26 of tape 20 required to cover structure 24 within the outer boundaries 25, which may be based on use of tape 20 having a specific width "W" (FIG. 1).

Operator input/output controls 118 may allow an operator to program the computer 110 and alter the software programs 114 as required. Data such as part numbers and other information relating to the structure 24 or the operation of the material placement head 36 may be stored in a memory 116. Also, the memory 116 can be used to store the outer boundaries 25 (FIGS. 1 and 2) of an application area 22 on the structure 24 for a particular part number, as well as the programmed path that the material placement head 36 uses to travel in order to cover the application area 22 with strips 26 of the tape 20. Sensors 112 may be provided which provide signals to the computer 110 relating to the sensed position of the robotic device 38 as well as the status of functions carried out by the material placement head 36.

Figure 17:
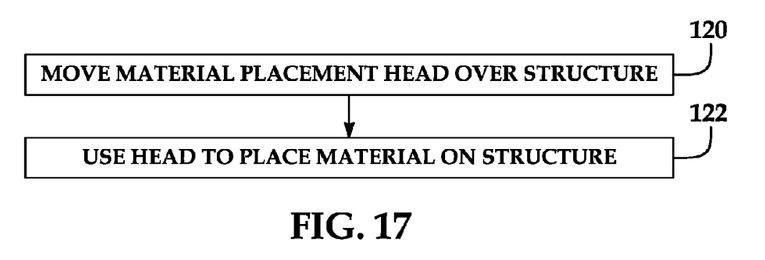
FIG. 17 is an illustration of a flow diagram showing the overall steps of a method of installing damping material on a structure.

FIG. 17 illustrates the overall steps of a method for installing damping material on a structure. As shown at step 120, the material placement head 36 is moved over the structure 24. The material placement head 36 is used to place damping material, such as the tape 20, on the structure 24 as the material placement head 36 moves over the structure 24, as shown at step 122.

Figure 18:
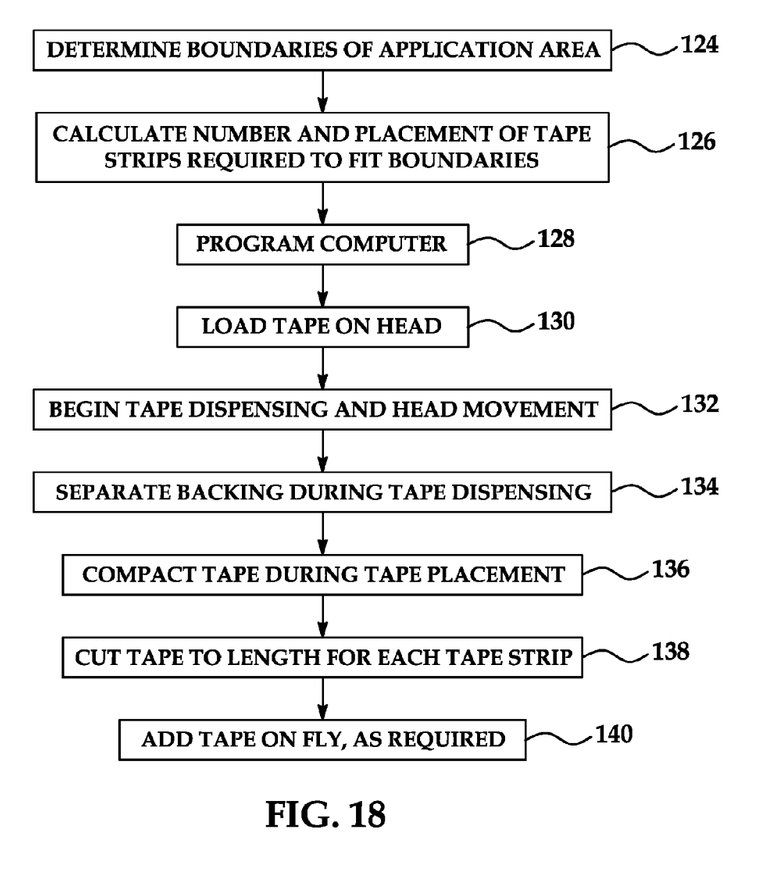
FIG. 18 is an illustration of a flow diagram showing additional details of the disclosed method.

FIG. 18 illustrates additional details of the method broadly shown in FIG. 17. Beginning at step 124, the outer boundaries 25 of an application area 22 on the structure 24 are determined, which will normally be established in digital form. Next, at step 126, the number and placement of strips 26 of tape 20 required to cover the application area 22 within the outer boundaries 25 may be calculated by the computer 110, which may be based on use of a tape 20 having a specific width "CW" (FIG. 1). At step 128, the computer 110 (FIG. 16) is programmed to control the movements of the material placement head 36, based on the number and placement of the strips 26 of tape 20 calculated at step 126. At step 130, a spool 54 of tape 20 is loaded onto the material placement head 36.

At step 132, tape 20 is dispensed from the spool 54 and the material placement head 36 is moved along a path that has been programmed in the computer 110 at step 128. As the tape 20 is being dispensed from the spool 54, the lower backing 30b is separated and accumulated on the take-up spool 70, as shown at step 134. As the tape 20 is being dispensed and fed to the compaction roller 48, the tape 20 is compacted against the structure 24, as shown at step 136. At step 138, the tape 20 being placed is cut to length for each strip in strips 26.

Figure 19:
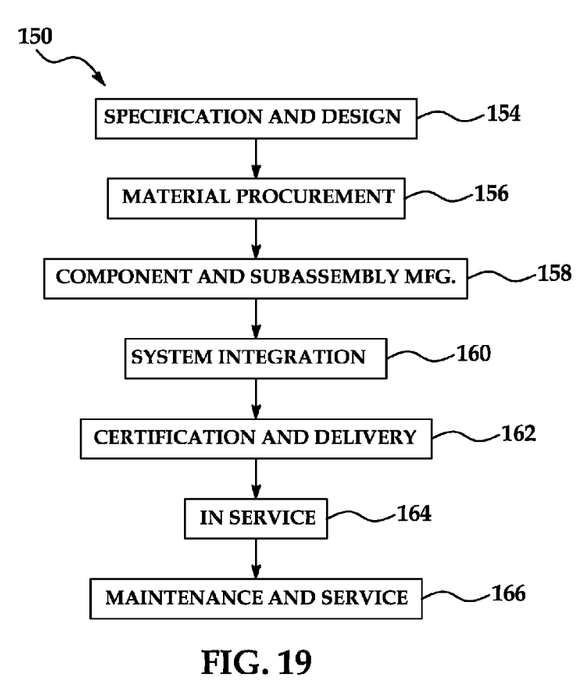
FIG. 19 is an illustration of a flow diagram of aircraft production and service methodology.
Figure 20:
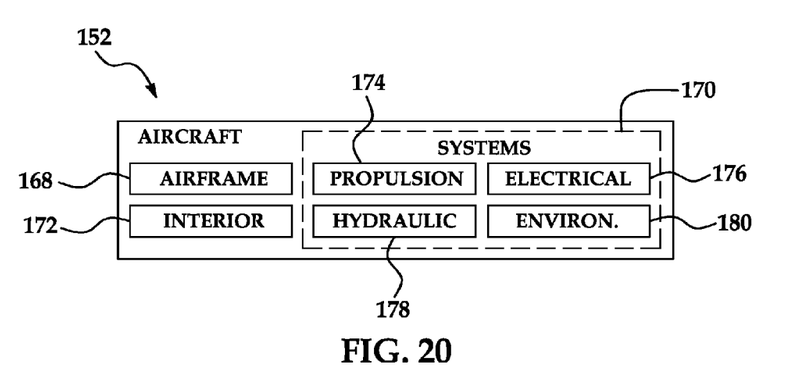
FIG. 20 is an illustration of a block diagram of an aircraft.

Embodiments of the disclosure may find use in a variety of potential applications, particularly in the transportation industry, including for example, aerospace, marine and automotive applications. Thus, referring now to FIGS. 19 and 20, embodiments of the disclosure may be used in the context of an aircraft manufacturing and service method 150 as shown in FIG. 19 and an aircraft 152 as shown in FIG. 20. During pre-production, manufacturing and service method 150 may include specification and design 154 of the aircraft 152 and material procurement 156 in which the disclosed method may be specified for use in applying damping materials on components. During production, component and subassembly manufacturing 158 and system integration 160 of the aircraft 152 takes place. The disclosed method and apparatus may be used to place damping materials on components that are later assembled and integrated with other subassemblies. Thereafter, the aircraft 152 may go through certification and delivery 162 in order to be placed in service 164. While in service by a customer, the aircraft 152 is scheduled for routine maintenance and service 166 (which may also include modification, reconfiguration, refurbishment, and so on). Components having damping material applied thereto according to the disclosed embodiments may be used to replace components on the aircraft 152 during the maintenance and service 166.

Each of the processes of manufacturing and service method 150 may be performed or carried out by a system integrator, a third party, and/or an operator (e.g., a customer). For the purposes of this description, a system integrator may include without limitation any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, the aircraft 152 produced by manufacturing and service method 150 may include an airframe 168 with a plurality of systems 170 and an interior 172. Examples of high-level systems 170 include one or more of a propulsion system 174, an electrical system 176, a hydraulic system 178, and an environmental system 180. Any number of other systems may be included. Although an aerospace example is shown, the principles of the disclosure may be applied to other industries, such as the marine and automotive industries.

Systems and methods embodied herein may be employed during any one or more of the stages of the manufacturing and service method 150. For example, components or subassemblies corresponding to manufacturing and service method 150 may be fabricated or manufactured in a manner similar to components or subassemblies produced while the aircraft 152 is in service. Also, one or more apparatus embodiments, method embodiments, or a combination thereof may be utilized during the component and subassembly manufacturing 158 and system integration 160, for example, by substantially expediting assembly of or reducing the cost of an aircraft 152. Similarly, one or more of apparatus embodiments, method embodiments, or a combination thereof may be utilized while the aircraft 152 is in service, for example and without limitation, to maintenance and service 166.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus for placing damping material on a structure, comprising:
    a tape holder configured to hold the damping material, the damping material comprising a tape having continuously adhesive surfaces on both sides of the tape and, prior to placement on the structure, the tape includes a first backing on a first side of the tape and a second backing on a second side of the tape;
    a first take-up roll disposed to one side of the tape as the tape is dispensed from the tape holder, the first take-up roll configured to receive the first backing as the first backing is removed from the tape during placement;
    a second take-up roll disposed to an opposite side of the tape relative to the one side as the tape is dispensed from the tape holder, the second take-up roll configured to receive the second backing as the second backing is removed from the tape during placement;

a material placement head configured to place the damping material on the structure after the first backing and the second backing have been removed;

a device configured to move the material placement head over the structure; and a controller configured to control operation of the material placement head to place the damping material on the structure and to control operation of the device to move the placement head over the structure.

2. The apparatus of claim 1, wherein the device includes a robotic device.

3. The apparatus of claim 1, wherein the material placement head includes:
   a dispenser configured to dispense the damping material; and
   a compactor configured to compact the damping material on the structure.

4. The apparatus of claim 3, wherein:
   the compactor includes a compaction roller; and
   the dispenser is configured to cut lengths of the tape fed to the compaction roller.

5. The apparatus of claim 1, wherein the controller includes:
   a computer; and
   a set of programmed instructions.

6. The apparatus of claim 4, wherein the compaction roller is mounted on a powered compaction slide.

7. The apparatus of claim 6, wherein the compaction slide is vertically reciprocable to the compaction roller.

8. The apparatus of claim 7, wherein the compaction slide is configured to displace the compaction roller downwardly into engagement with the structure.

9. The apparatus of claim 8, wherein the compaction slide is further configured to be powered upwardly so that the compaction roller disengages the structure.

10. The apparatus of claim 2, wherein the material placement head is releasably mounted on the robotic device.

11. An apparatus for placing acoustic damping tape on an aircraft structure, comprising:
    a material placement head configured for placing strips of the damping tape in a pre-programmed arrangement on the structure, the placement head including:
       a supply spool of the damping tape, the damping tape having continuously adhesive surfaces on both sides of the damping tape, a first backing on a first side of the damping tape and a second backing on a second side of the damping tape;
       a dispenser for dispensing the tape from the supply spool;
       a cutter assembly for cutting lengths of the dispensed tape;
       a first take-up spool for taking up a first backing removed from the tape as the tape is being dispensed;
       a second take-up spool for taking up a second backing removed from the tape as the tape is being dispensed, the second take up pool positioned opposite the first take-up spool relative to the tape; and
       a compaction roller for compacting the cut lengths of tape against the structure after the first backing and the second backing have been removed;
    a robotic device configured to move the material placement head across the structure; and
    a programmed computer configured to control operation of the placement head and the robotic device.

12. The apparatus of claim 11, wherein the material placement head is releasably mounted on the robotic device.

13. The apparatus of claim 12, wherein the aircraft structure is a fuselage section, and further comprising:
    the fuselage section supported on a rotatable mandrel; and
    the robotic device mounted on a track allowing linear movement along the length of the fuselage section, wherein the linear movement of the robotic device and rotation of the mandrel positions the material placement head such that damping material is applied to a desired area of the fuselage section.

14. A mobile apparatus for automated placement of damping material on a structure, the damping material having continuously adhesive surfaces on both sides of the damping material, a first backing on a first side of the damping material, and a second side on a second side of the damping material:
    at least one material placement head configured to place the damping material on the structure after the first backing has been removed and placed on a first take-up roller connected to the at least one material placement head and after the second backing has been removed and placed on a second take-up roller connected to the at least one material placement head;
    at least one manipulator configured to move the material replacement head along multiple axes over the structure; and
    a controller configured to control operation of the at least one material placement head to place the damping material on the structure and to control operation of the at least one manipulator to move the material placement head over the structure.

15. The mobile apparatus of claim 14, further comprising:
    the at least one manipulator comprising one of a pair of robotic devices mounted on a mobile device and multiple gantries, wherein each of the robotic devices in the pair of robotic devices having a multi-axis arm and wrist assembly, the wrist assembly including an end effector configured to attach to the material placement head; and
    the controller including operator controls, an onboard computer, and related components for controlling the operation of the at least one manipulator in moving the material placement head.

16. The mobile apparatus of claim 14, further including a system for indexing the material placement head to a new location to determine correct positioning of the strips of tape.

* * * * *